United States Patent
Wu et al.

(10) Patent No.: US 8,300,145 B2
(45) Date of Patent: Oct. 30, 2012

(54) APPARATUS AND METHOD OF FRAME RATE UP-CONVERSION WITH DYNAMIC QUALITY CONTROL

(75) Inventors: Hung Wei Wu, Tai Pei County (TW); Chih-Yu Chang, Hsin Chu (TW); Wen-Yen Huang, Hsin Chu (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 374 days.

(21) Appl. No.: 12/723,785

(22) Filed: Mar. 15, 2010

(65) Prior Publication Data

US 2011/0075027 A1 Mar. 31, 2011

(30) Foreign Application Priority Data

Jun. 29, 2009 (TW) .............................. 98121763 A

(51) Int. Cl.
*H04N 11/20* (2006.01)
*H04N 5/14* (2006.01)

(52) U.S. Cl. ....................................... 348/441; 348/701
(58) Field of Classification Search .................. 348/441, 348/459, 97, 699–701; 375/240.12, 240.16
See application file for complete search history.

(56) References Cited

U.S. PATENT DOCUMENTS

| | | | | |
|---|---|---|---|---|
| 6,671,323 | B1 * | 12/2003 | Tahara et al. | 375/240.26 |
| 7,499,494 | B2 * | 3/2009 | Nair et al. | 375/240.16 |
| 2009/0115909 | A1 * | 5/2009 | Walls et al. | 348/699 |
| 2009/0161010 | A1 * | 6/2009 | Tran et al. | 348/441 |
| 2009/0245694 | A1 * | 10/2009 | Sartor et al. | 382/300 |
| 2011/0109796 | A1 * | 5/2011 | Subedar et al. | 348/459 |

* cited by examiner

*Primary Examiner* — Victor Kostak
(74) *Attorney, Agent, or Firm* — Muncy, Geissler, Olds & Lowe, PLLC

(57) ABSTRACT

A frame rate up-conversion apparatus comprises a motion vector detecting circuit, a dynamic quality control circuit, a motion compensation circuit and a pull-down recovery circuit. According to quality of motion vectors, a corresponding image output mode is determined dynamically. A visual impact due to incorrect motion vectors is reduced and the visual experience is also improved.

18 Claims, 10 Drawing Sheets

APPARATUS AND METHOD OF FRAME RATE UP-CONVERSION WITH DYNAMIC QUALITY CONTROL

This application claims the benefit of the filing date of Taiwan Application Ser. No. 098121763, filed on Jun. 29, 2009, the content of which is incorporated herein by reference.

BACKGROUND OF THE INVENTION

1. Field of the invention

The invention relates to frame rate up-conversion (FRUC), particularly to an apparatus and method of frame rate up-conversion with dynamic quality control.

2. Description of the Related Art

Frame rate up-conversion (FRUC) is the conversion process between any two display formats with different frame rates. FRUC has various applications, e.g., saving bandwidth in low bit-rate video transmission, reducing movies juddering in converting a 24 fps video source into a higher frame rate and reducing blurring effect in a hold-type liquid crystal display (LCD).

Most FRUC use motion estimation (ME) to obtain motion vectors of moving objects and then perform motion compensated interpolation (MCI) to interpolate images of the moving objects in different frames. Most ME methods calculate motion vectors with the minimum sums of absolute difference (SAD) according to block matching estimation algorithm. However, under certain circumstances, many ME methods are inclined to fall in the trap of the local minimum SAD value. That is, a motion vector with the local minimum SAD value is not necessarily the real motion vector of a moving object; furthermore, even a motion vector with the global minimum SAD value is not necessarily the real motion vector of the moving object.

For example, movie films typically operate at 24 frames per second (fps) while televisions usually use higher frame rate (e.g., 60/120 Hz for NTSC and 50/100 Hz for PAL). FRUC is used to convert a 24 fps film to a higher frame rate for advanced displace devices. According to FRUC, artificial frames are interpolated between two original consecutive frames. FRUC is proposed to obtain better image quality. However, wrong motion vectors degrade image quality significantly and current ME algorithms cannot ensure to find out the correct motion vectors.

SUMMARY OF THE INVENTION

In view of the above-mentioned problems, an object of the invention is to provide an apparatus of frame rate up-conversion, which determines a corresponding image output mode dynamically according to quality of motion vectors, thereby reducing a visual impact due to incorrect motion vectors.

To achieve the above-mentioned object, the apparatus of the frame rate up-conversion of the invention is configured to receive a current image and a previous image and generate at least one intermediate image. The apparatus comprises: a motion vector (MV) detecting circuit for performing forward motion estimation and backward motion estimation to generate a forward MV table, a backward MV table and at least one table of minimum motion estimation (ME) errors according to the current image and the previous image; a control circuit for generating a control signal according to the forward MV table, the backward MV table and the at least one table of minimum ME errors; and, a motion compensation circuit for performing corresponding image interpolation in response to the control signal to generate the at least one intermediate image according to the forward MV table, the backward MV table, the current image and the previous image; wherein the control signal is related to one of a high quality mode, at least one intermediate mode and a repeat mode; and, wherein the sequence of the current image and the previous image corresponds to an original film sequence.

Another object of the invention is to provide a method of frame rate up-conversion, configured to receive a current image and a previous image and generate at least one intermediate image. The method comprises: performing forward motion estimation and backward motion estimation to generate a forward MV table, a backward MV table and at least one table of minimum motion estimation (ME) errors according to the current image and the previous image; determining an image output mode according to the forward MV table, the backward MV table and the at least one table of minimum ME errors; and, performing corresponding image interpolation in response to the image output mode to generate the at least one intermediate image according to the forward MV table, the backward MV table, the current image and the previous image; wherein the image output mode is one of a high quality mode, at least one intermediate mode and a repeat mode; and, wherein the sequence of the current image and the previous image corresponds to an original film sequence.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

A feature of the invention is to determine the number of interpolated images dynamically according to motion vector quality. If the motion vector quality is good enough, all intermediate images are the interpolated images (the definitions of an intermediate image and a interpolated image will be described later). If the motion vector quality is general, parts of the intermediate images are repeat image (repeating the previous original image) and parts of the intermediate images are the interpolated images. If the motion vector quality is poor, then all the intermediate images are repeat images. The better the motion vector (MV) quality, the more the number of the interpolated images and the less the number of the repeat images.

The input image of a FRUC apparatus of the invention can be a frame or a field. The following embodiments will be all described in terms of frames.

Figure 1:
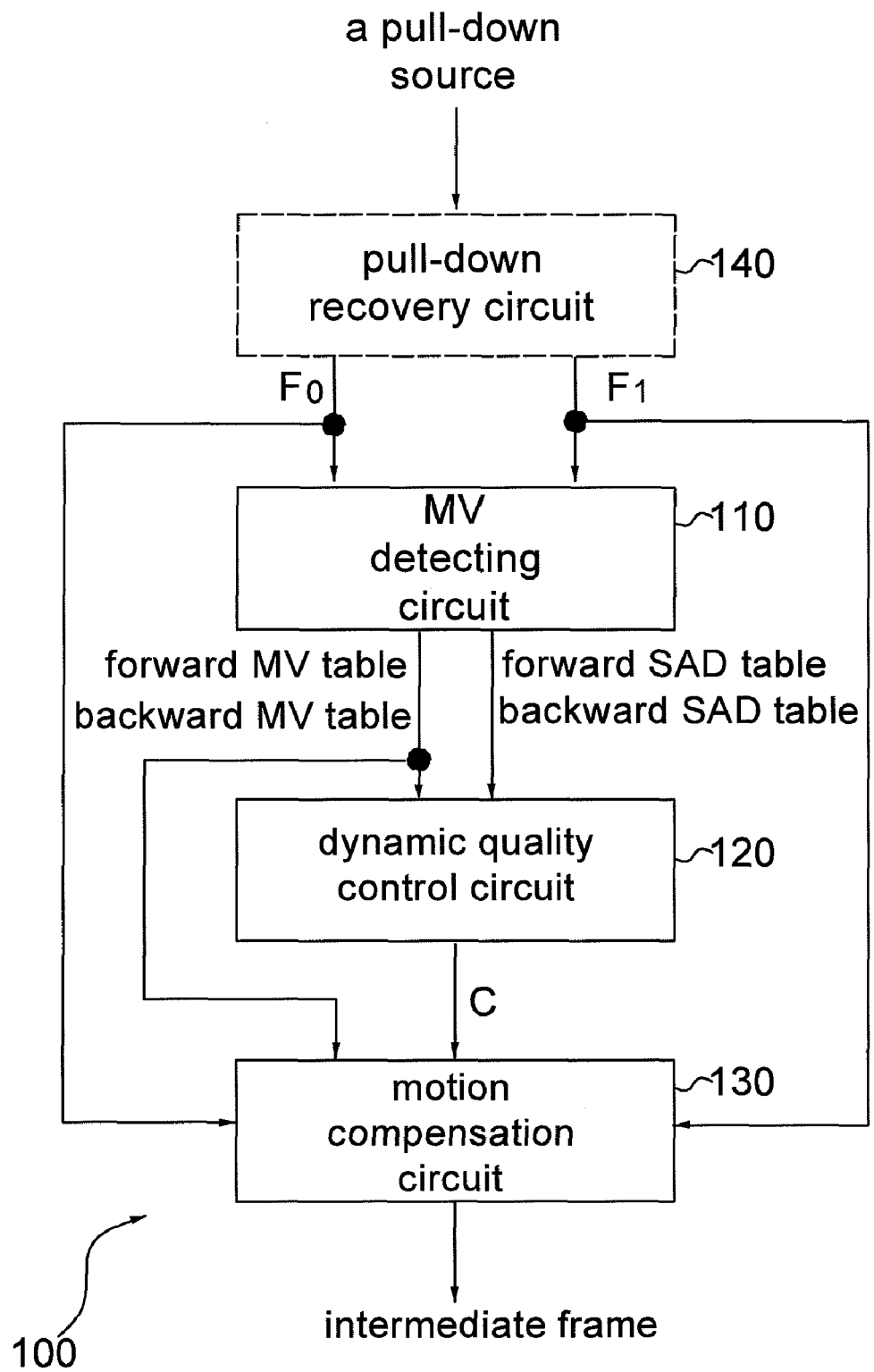
FIG. 1 shows a block diagram of a FRUC apparatus according to an embodiment of the invention.

FIG. 1 shows a block diagram of a FRUC apparatus according to an embodiment of the invention. Referring to FIG. 1, a FRUC apparatus of the invention 100 includes a MV detecting circuit 110, a dynamic quality control circuit 120, a motion compensation circuit 130 and a pull-down recovery circuit 140. After receiving a current frame F1 and a previous frame F0, the MV detecting circuit 110 first divides the current frame F1 and the previous frame F0 respectively into the same number of blocks (for example: N×M pixels), and then performs forward motion estimation (FME) and backward motion estimation (BME) to obtain forward motion vectors and backward motion vectors. Next, according to the forward motion vectors and the backward motion vectors, the MV detecting circuit 110 generates a forward MV table, a backward MV table, a table of forward minimum ME errors and a table of backward minimum ME errors. The above-mentioned minimum ME errors can be estimated by use of Sum of Absolute Difference (SAD), Mean Absolute Difference (MAD), Mean Square Error (MSE), or all the known approaches that can estimate motion vectors. The embodiments of the invention apply the SAD values, so the minimum ME errors are referred to as the "SAD values".

Figure 2A:
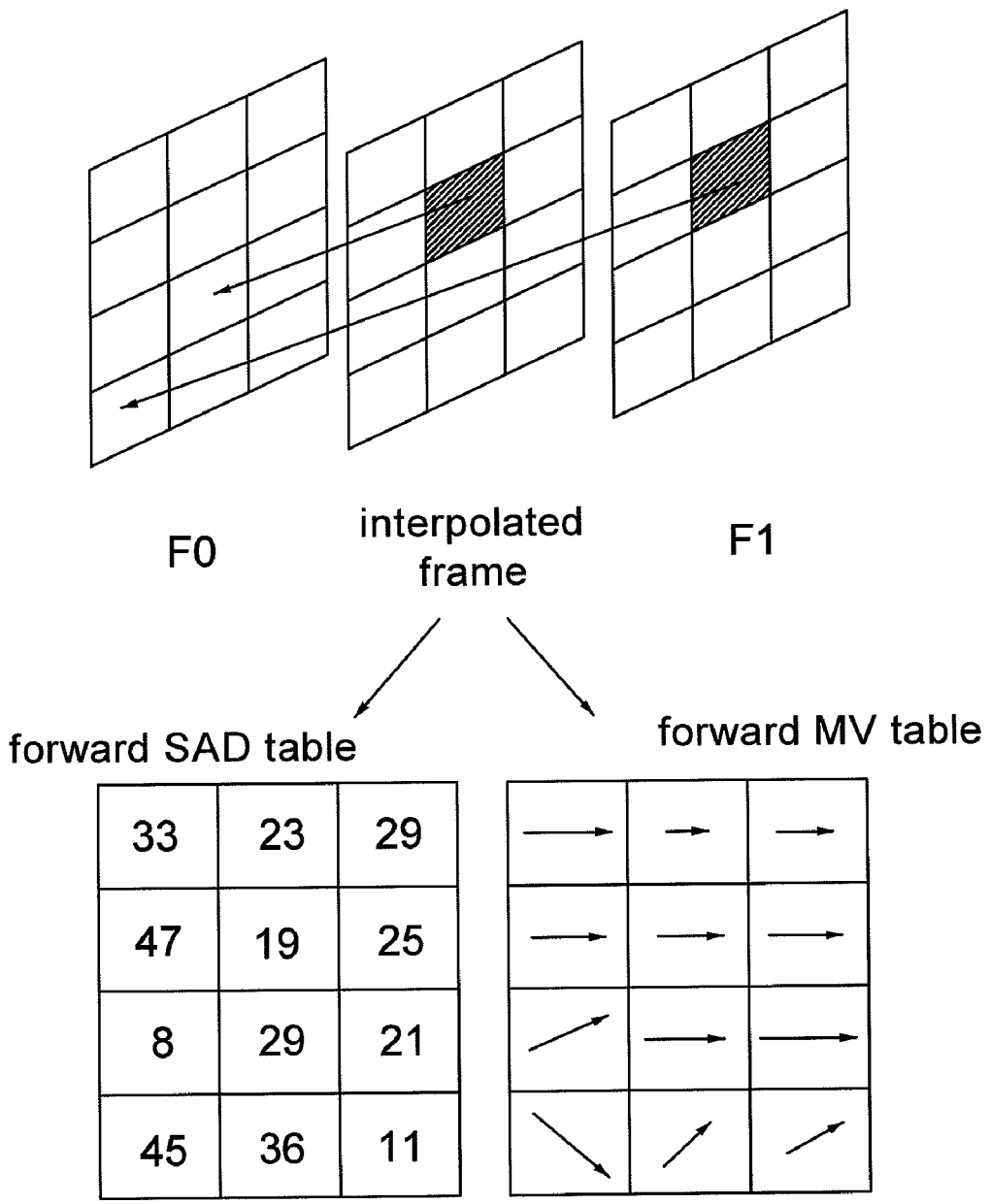
FIG. 2A shows an example that the MV detecting circuit performs forward motion estimation.
Figure 2B:
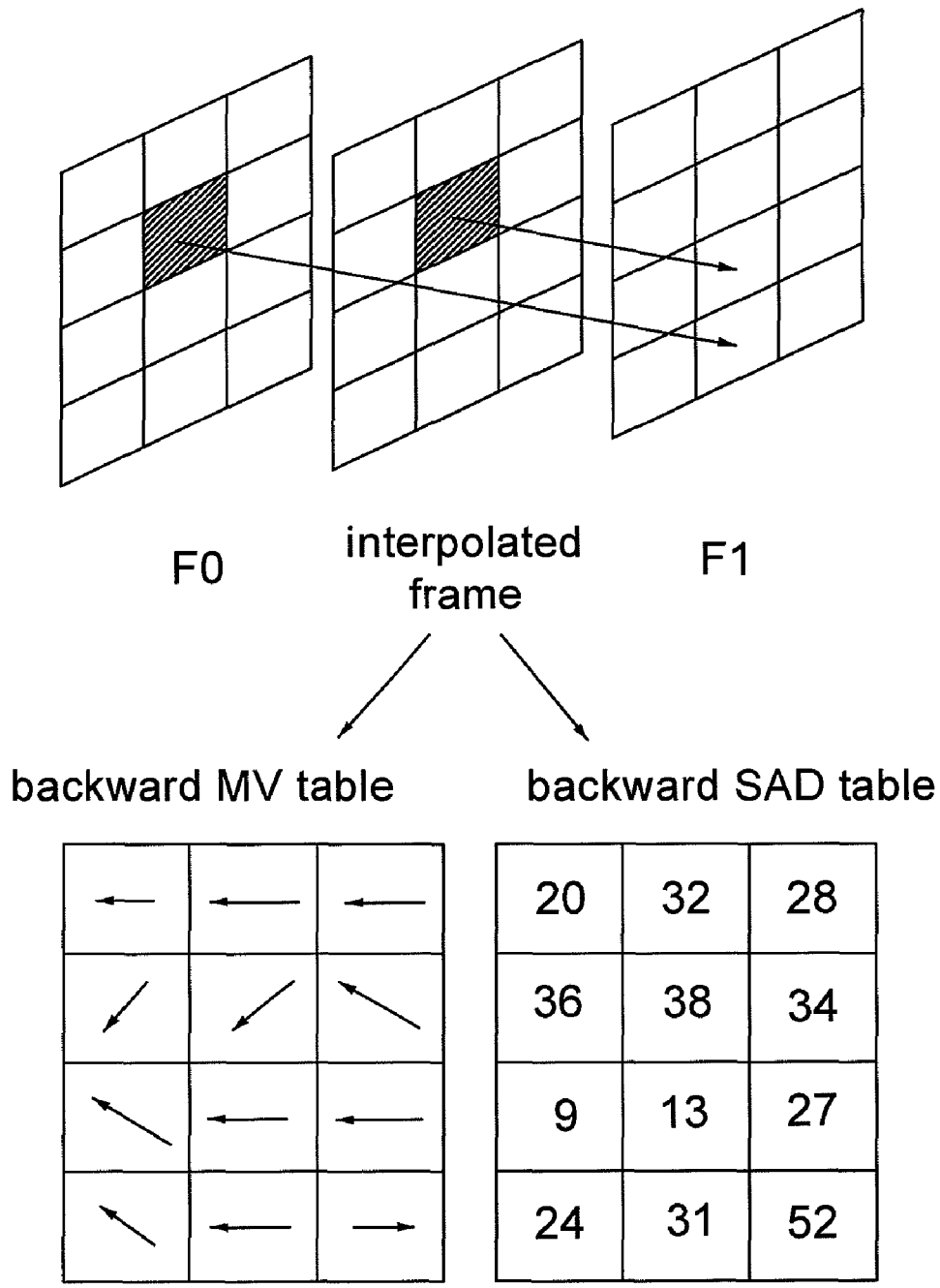
FIG. 2B shows another example that the MV detecting circuit performs backward motion estimation.

By way of example but not limitation, FIG. 2A shows an example that the MV detecting circuit 110 performs FME. FIG. 2B shows another example that the MV detecting circuit 110 performs BME. The MV detecting circuit 110 performs FME based on the block matching estimation algorithm. The MV detecting circuit 110 first divides the current frame F1 into a number of blocks having a constant size, and then searches the previous frame F0 for a corresponding position of a target block of the current frame F1. Normally, the best matching block in the previous frame F0 has a MV with the minimum SAD value and hence the MV with the minimum SAD value is called the forward motion vector $MV_f$ of the target block. After the MV detecting circuit 110 performs FME based on the current frame F1 and the previous frame F0, a plurality of obtained forward motion vectors $MV_f$ form a forward MV table, and meanwhile, corresponding minimum SAD values of the obtained forward motion vectors $MV_f$ form a forward SAD table, as shown in FIG. 2A. Likewise, the MV detecting circuit 110 performs BME based on the block matching estimation algorithm. The MV detecting circuit 110 first divides the previous frame F0 into a number of blocks having a constant size, and then searches the current frame F1 for a corresponding position of a target block of the previous frame F0. Normally, the best matching block in the current frame F1 has a MV with the minimum SAD value and hence the MV with the minimum SAD value is called the backward motion vector $MV_b$ of the target block. After the MV detecting circuit 110 performs BME based on the current F1 and the previous frame F0, a plurality of obtained backward motion vectors $MV_b$ form a backward MV table, and meanwhile, corresponding minimum SAD values of the backward motion vectors $MV_b$ form a backward SAD table, as shown in FIG. 2B. Thereafter, the MV detecting circuit 110 transmits the forward MV table, the forward SAD table, the backward MV table and the backward SAD table to the dynamic quality control circuit 120. Meanwhile, the MV detecting circuit 110 transmits the forward MV table and the backward MV table to the motion compensation circuit 130. In an embodiment, the following equations are provided in the MV detecting circuit 110 to obtain the forward MV table, the forward SAD table, the backward MV table and the backward SAD table related to the current frame F1 and the previous frame F0:

$$SAD_f(x, y, MVx, MVy) = \sum_{i=0}^{N-1}\sum_{j=0}^{M-1} |F0(x+i-MVx, y+j-MVy) - F1(x+i, y+j)| \quad (1)$$

$$MV_f(x, y) = \operatorname{argmin}\{(MVx, MVy) \mid SAD_f(x, y, MVx, MVy)\} \quad (2)$$

$$SAD_b(x, y, MVx, MVy) = \sum_{i=0}^{N-1}\sum_{j=0}^{M-1} |F0(x+i, y+j) - F1(x+i+MVx, y+j+MVy)| \quad (3)$$

$$MV_b(x, y) = \operatorname{argmin}\{(MVx, MVy) \mid SAD_b(x, y, MVx, MVy)\} \quad (4)$$

where x and y denote the coordinates of a target block in a frame, N and M denote the block size (i.e. N×M pixels), $MV_x$ and $MV_y$ denote motion vectors, $SAD_f$ denotes a SAD value in forward search and $SAD_b$ denotes a SAD value in backward search. In mathematics, the function arg min stands for the argument of the minimum. Accordingly, in equation (2), the function arg min$\{(MV_x,MV_y)|SAD_f(x, y, MV_x, MV_y)\}$ stands for a motion vector $(MV_x,MV_y)$ for which $SAD_f(x, y, MV_x, MV_y)$ has the minimum $SAD_f$ value. In equation (4), the function arg min$\{(MVx,MVy)|SAD_b(x, y, MVx,MVy)\}$ stands for a motion vector $(MV_x,MV_y)$ for which $SAD_b(x, y, MV_x, MV_y)$ has the minimum $SAD_b$ value.

The dynamic quality control circuit 120 generates a control signal C related to one of image output modes according to the forward MV table, the forward SAD table, the backward MV table and the backward SAD table. At last, after receiving the control signal C, the forward MV table, the backward MV table and the current frame F1 and the previous frame F0, the motion compensation circuit 130 performs motion-compensated interpolation to generate at least one intermediate frame according to the control signal C related to one of the image output modes. Operations of the dynamic quality control circuit 120 and the image output modes will be described a little later.

In the embodiment, a pull-down recovery circuit 140 is installed at the previous stage of the MV detecting circuit 110.

Figure 3A:
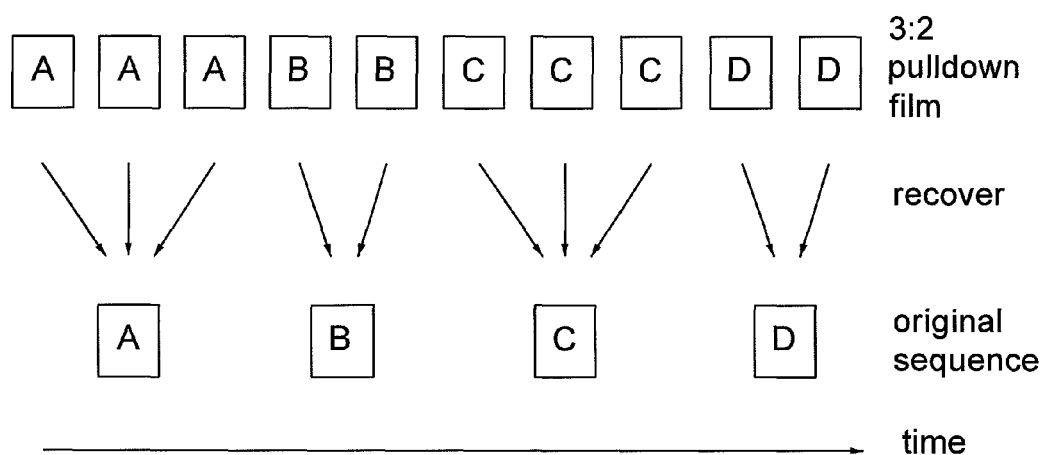
FIG. 3A shows that an original film sequence is recovered from a 3:2 pull-down film.
Figure 3B:
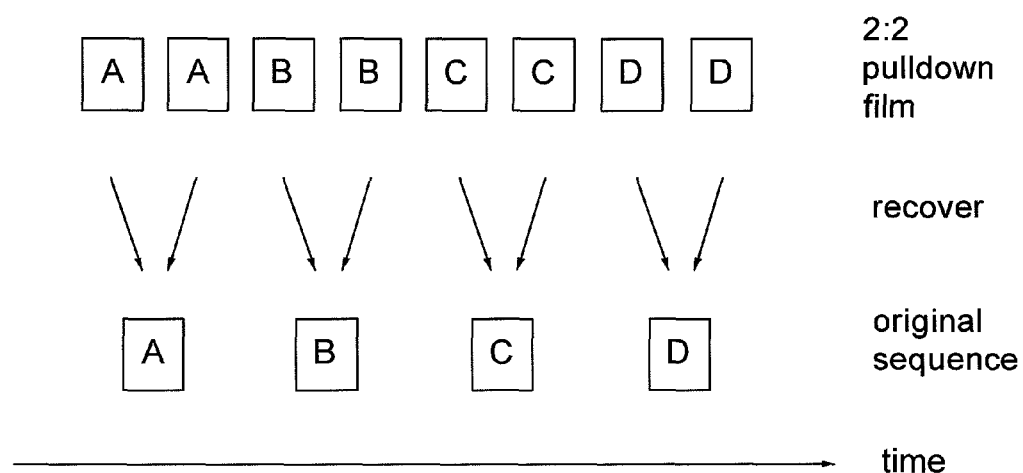
FIG. 3B shows that another original film sequence is recovered from a 2:2 pull-down film.

The pull-down recovery circuit 140 is used to recover an input film of a pull-down source to its original film sequence (e.g., at 24 frames per second), thereby generating the current frame F1 and previous frame F0 related to the original film sequence. For example, the pull-down recovery circuit 140 recovers a 3:2 pull-down film or a 2:2 pull-down film to its original film sequence. As shown in FIG. 3A, a 3:2 pull-down film sequence is "A-A-A-B-B-C-C-C-D-D"; thus, its original film sequence returns to "A-B-C-D" after the pull-down recovery circuit 140 reconstructs the original frames of the 3:2 pull-down film. As shown in FIG. 3B, the 2:2 pull-down film sequence is "A-A-B-B-C-C-D-D"; thus, its original film sequence returns to "A-B-C-D" after the pull-down recovery circuit 140 reconstructs the original frames of the 2:2 pull-down film. Since the implementation of the pull-down recovery circuit 140 is well known to those skilled in the art and therefore will not be described herein. It should be noted that, no matter what circuit is installed at the previous stage of the MV detecting circuit 110, the film sequence inputted into the MV detecting circuit 110 must be the film's original sequence. In other words, the input video source of the MV detecting circuit 110 must be a video source with its original film sequence. Accordingly, the pull-down recovery circuit 140 is optional and thus represented by the dotted lines in FIG. 1.

Figure 4:
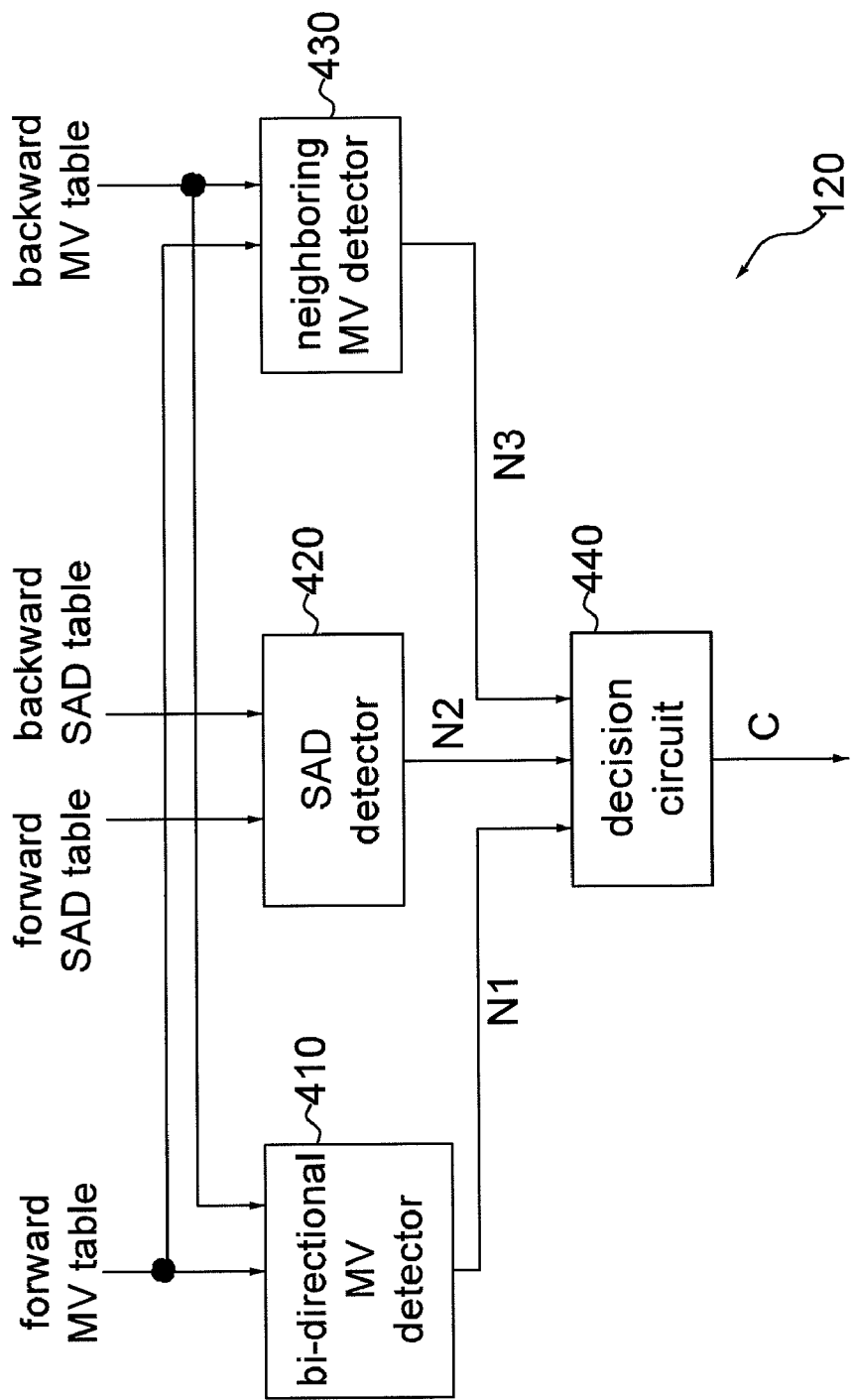
FIG. 4 shows a block diagram of a dynamic quality control circuit according to an embodiment of the invention.

FIG. 4 shows a block diagram of a dynamic quality control circuit according to an embodiment of the invention. Referring to FIG. 4, the dynamic quality control circuit 120 of the invention includes a bi-directional MV detector 410, a SAD detector 420, a neighboring MV detector 430 and a decision circuit 440. Referring now to FIGS. 1, 2A, 2B and 4, after receiving the forward MV table and backward MV table from the MV detecting circuit 110, the bi-directional MV detector 410 checks if the forward MV and the backward MV of the same block match, and then generates a count value N1. In practice, if the forward MV of a block in the forward MV table of FIG. 2A matches the backward MV of the same block (having the same coordinates) in the backward MV table of FIG. 2B, the forward MV and the backward MV of the same block will point in exactly opposite directions (180 degrees) and have the same magnitude. For example, the forward MV of the most top left block points to the right while the backward MV of the same block points to the left, so the directions of the forward MV and the backward MV match. The forward MV of the most bottom right block points to the top right direction while the backward MV points to the right, so the directions of the forward MV and the backward MV do not match. Accordingly, in an embodiment, assuming that a direction error tolerance range is 10% and a magnitude error tolerance range is 15%, the bi-directional MV detector 410 first resets the count value N1 to 0 and rotates all the motion vectors of the backward MV table in the exactly opposite directions. Then, from the most top-left block to the most bottom-right block of the frame, the bi-directional MV detector 410 sequentially checks if the forward MV and the backward MV of each block are equal in direction and in magnitude. If both the directions and the magnitudes of the forward MV and the backward MV of any block are out of the error tolerance ranges, then the count value N1 will be incremented by one; otherwise, the count value N1 remains unchanged. The final count value N1 will not be outputted until the bi-directional MV detector 410 finishes checking the forward MVs and the backward MVs of all blocks.

After receiving the forward SAD table and the backward SAD table from the MV detecting circuit 110, the SAD detector 420 checks if the minimum SAD value of each block in the forward SAD table and in the backward SAD table is greater than a threshold value, and then generates a count value N2. The greater the minimum SAD value of a block, the less reliable the motion vector of the same block. In one embodiment, the SAD detector 420 first resets the count value N2 to 0 and sequentially checks, from the most top left block to the most bottom right block of the forward SAD table, whether the minimum SAD value of each block in the forward SAD table is greater than a threshold value. If the minimum SAD value of any block in the forward SAD table is greater than the threshold value, the count value N2 will be incremented by one; otherwise, the count value N2 remains unchanged. Then, the SAD detector 420 sequentially checks, from the most top left block to the most bottom right block of the backward SAD table, whether the minimum SAD value of each block in the backward SAD table is greater than the threshold value. If the minimum SAD value of any block in the backward SAD table is greater than the threshold value, the count value N2 is incremented by one; otherwise, the count value N2 remains unchanged. The final count value N2 will not be outputted until the SAD detector 420 finishes checking all the blocks of the forward SAD table and the backward SAD table. In an alternative embodiment, in order to reduce the processing time and hardware cost, the MV detecting circuit 110 can only generate one of the forward SAD table and the backward SAD table. Correspondingly, the SAD detector 420 will only check if the minimum SAD value of each block in one of the forward SAD table and the backward SAD table is greater than a threshold value, and thus generates the count value N2.

After receiving the forward MV table and the backward MV table from the MV detecting circuit 110, the neighboring MV detector 430 sequentially checks if the magnitudes and the directions of the neighboring motion vectors in the forward MV table and in the backward MV table match, and thus to generate a count value N3. In an embodiment, assuming that a direction error tolerance range is 10% and a magnitude error tolerance range is 15%, the neighboring MV detector 430 first resets the count value N3 to 0 and sequentially checks, from the most top left block to the most bottom right block of the forward MV table, whether the direction and the magnitude of the motion vector of each block match the directions and the magnitudes of the motion vectors of its neighboring blocks. If both the directions and the magnitudes of the vectors of an interested block and its neighboring blocks are out of the error tolerance ranges, the count value N3 will be incremented by one; otherwise, the count value N3 remains unchanged. Likewise, the neighboring MV detector 430 sequentially checks, from the most top left block to the most bottom right block of the backward MV table, whether the directions and the magnitudes of the motion vectors of each block and its neighboring blocks match. The final count value N3 will not be outputted until the neighboring MV detector 430 finishes checking the motion vectors of all the blocks of the forward MV table and the backward MV table. For example, as can be observed from the backward MV table of FIG. 2B, the direction of the motion vector of the most bottom right block is obviously different from those of its three neighboring blocks and the count value N3 will be incremented by one if both the direction and the magnitude of the most bottom right block are out of the error tolerance ranges. In addition, as can be observed from the nine blocks of the upper three rows of the forward MV table in FIG. 2A, the motion vectors of the middle block and its eight neighboring blocks are obviously consistent in direction and in magnitude. In other words, both the direction and the magnitude fall within the error tolerance range, so the count value N3 remains unchanged.

After receiving the count values N1, N2 and N3, the decision circuit 440 measures the MV quality to determine a image output mode and finally generates a control signal C corresponding to the image output mode. In an embodiment, if any one of the N1, N2 and N3 values is greater than a preset threshold value th_bx, i.e. (N1>th_b1) or (N2>th_b2) or (N3>th_b3), it represents the MV quality is bad and the decision circuit 440 will set the image output mode to a repeat mode. On the contrary, if all the N1, N2 and N3 values are less than a preset threshold value th_ax, i.e. (N1<th_a1) and (N2<th_a2) and (N3<th_a3), it represents the MV quality is excellent and the decision circuit 440 will set the image output mode to a high quality mode. If the N1, N2 or N3 values fall in between the above-mentioned preset threshold values, it represents the MV quality is general and the decision circuit 440 will set the image output mode to an intermediate mode. According to the image output mode, the decision circuit 440 generates the control signal C corresponding to one of the repeat mode, the intermediate mode and the high quality mode. Finally, the motion compensation circuit 130 will perform motion-compensated interpolation to generate at least one intermediate frame according to the image output mode contained in the control signal C.

Figure 5:
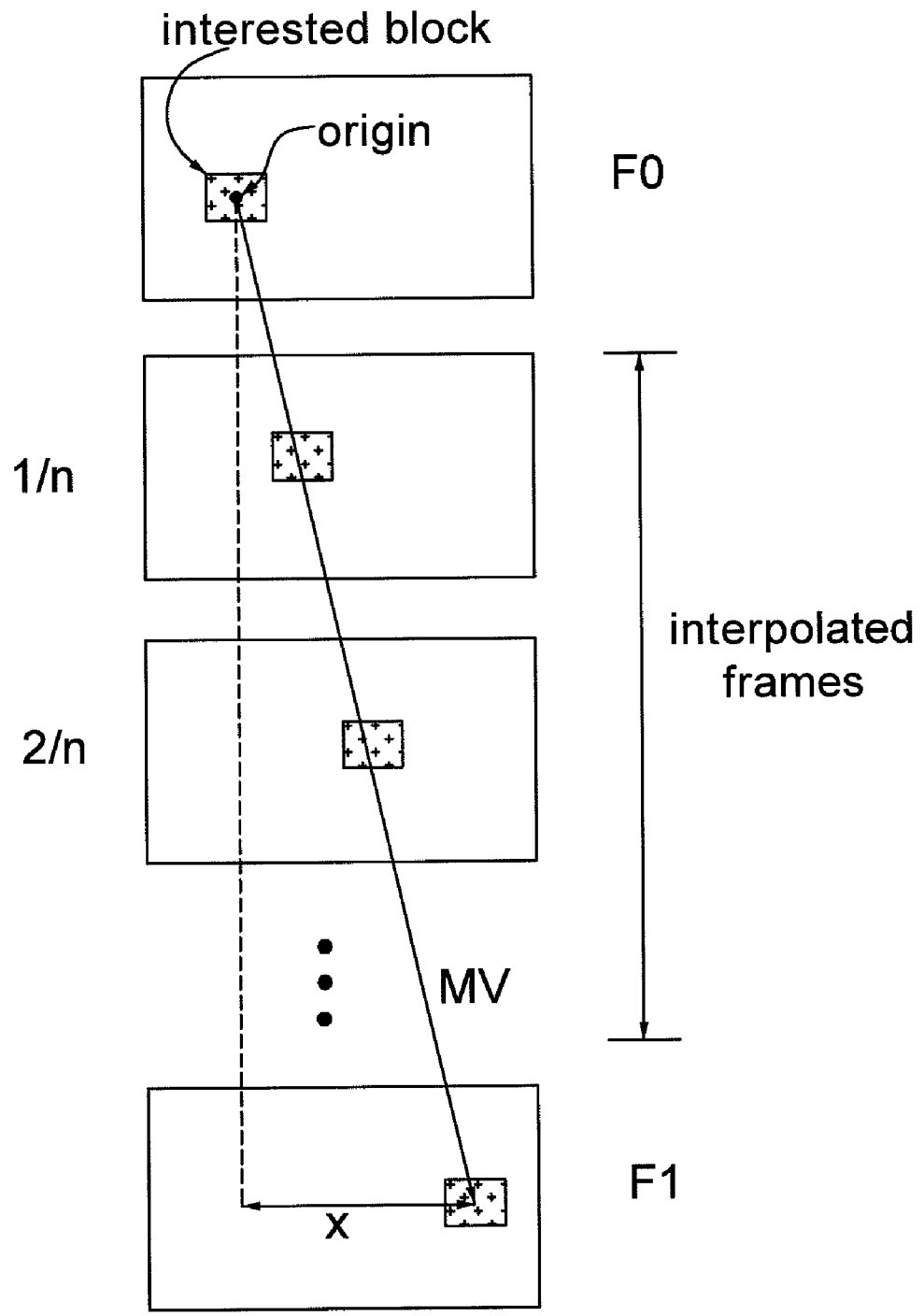
FIG. 5 shows a relationship of the previous frame, the current frame and a plurality of interpolated frames.

FIG. 5 shows a relationship of the previous frame, the current frame and a plurality of interpolated frames. Referring to FIG. 5, assuming n denotes the enlargement factor by which the frame rate is increased, the interpolated frame 1/n denotes a displacement ((1/n)×MV) of an interested block in reference to an origin in the previous frame F0, the interpolated frame 2/n denotes a displacement ((2/n)×MV) of the interested block in reference to the origin in the previous frame F0. Likewise, the interpolated frame (n−1)/n denotes a displacement (((n−1)/n)×MV) of the interested block in reference to the origin in the previous frame F0. For example, if n=5 and x=10, the MV of the interested block is equal to (10i+5j). The interpolated frame 1/5 denotes a displacement (2i+1j) of the interested block in reference to the origin in the previous frame F0, and the interpolated frame 2/5 denotes a displacement (4i+2j) of the interested block in reference to the origin in the previous frame F0.

Figure 6A:
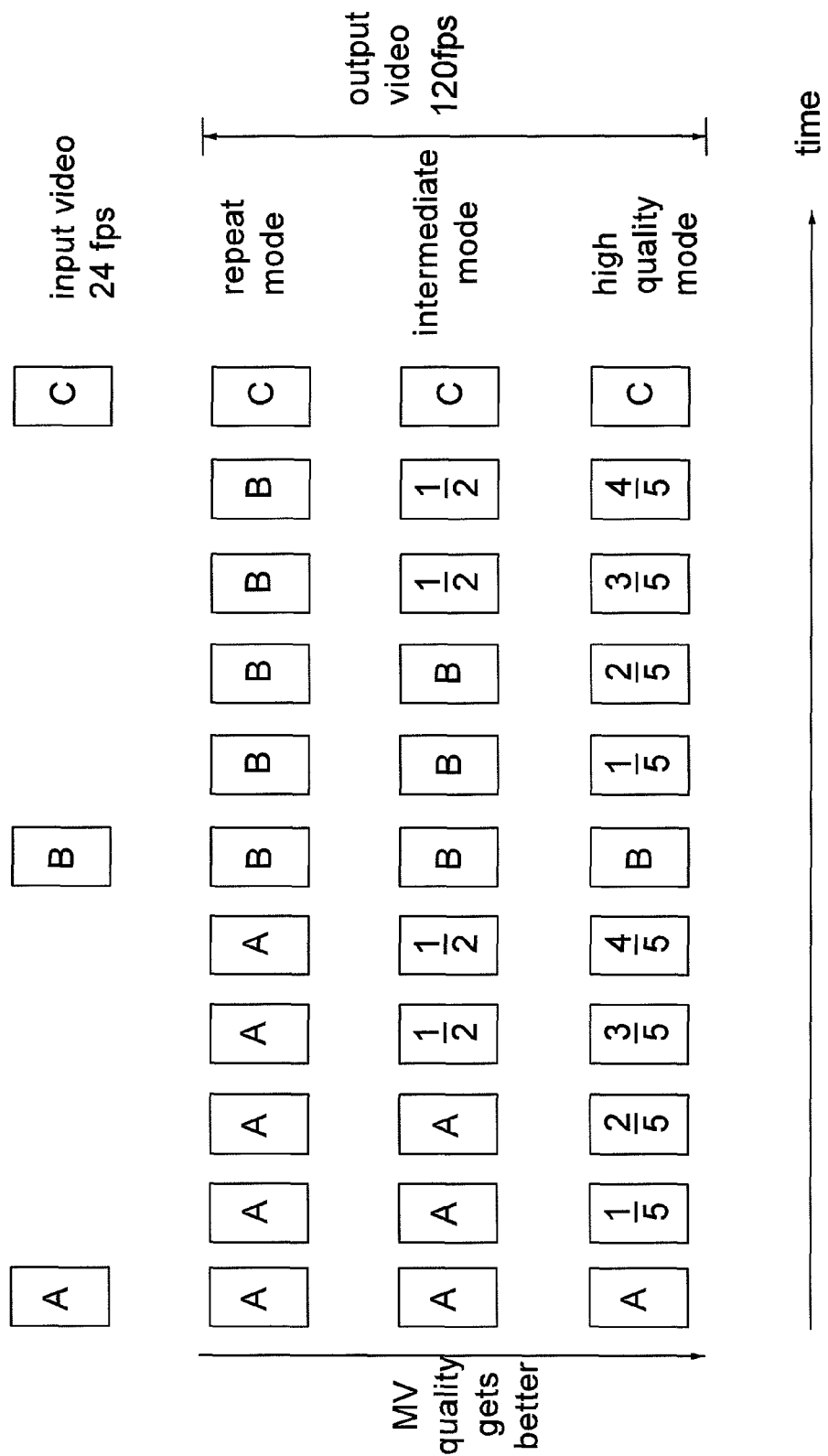
FIG. 6A shows a relationship of an input video stream and three output video streams corresponding to three image output modes when the frame rate is increased from 24 fps to 120 fps.
Figure 6B:
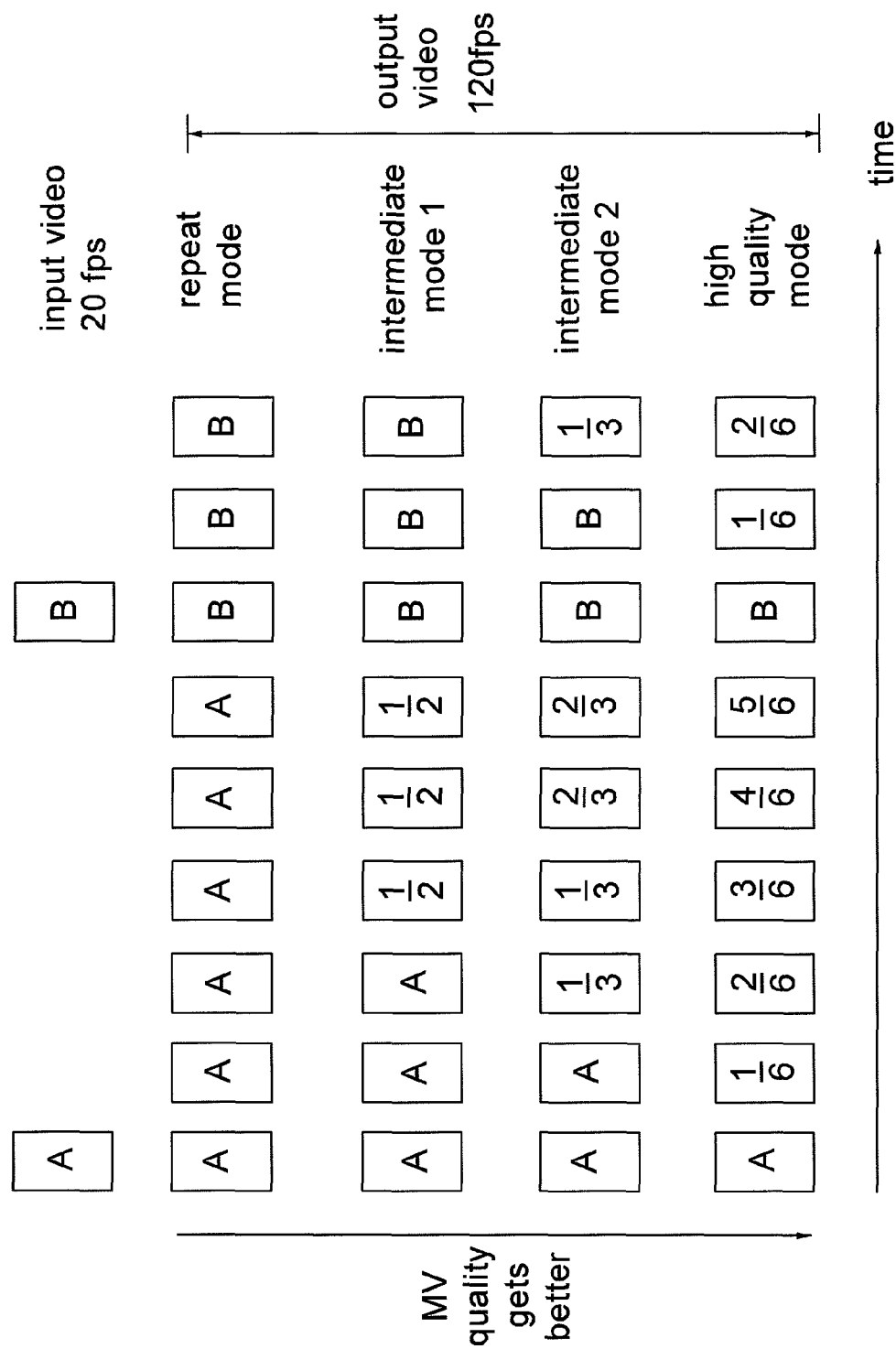
FIG. 6B shows a relationship of an input video stream and four output video streams corresponding to four image output modes when the frame rate is increased from 20 fps to 120 fps.
Figure 6C:
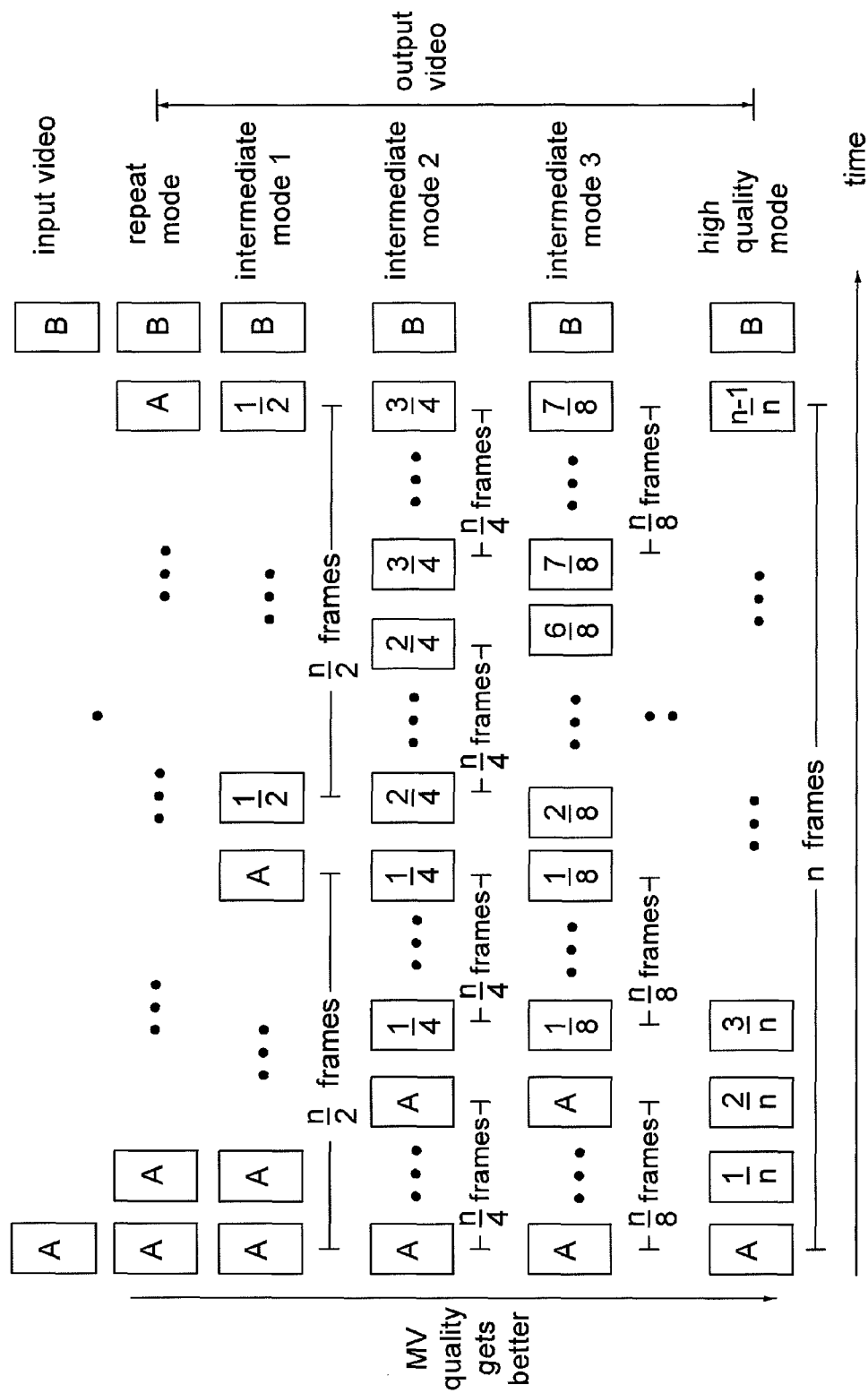
FIG. 6C shows a relationship of an input video stream and a plurality of output video streams when the frame rate is increased from P fps to Q fps.

It should be noted that the frames expressed as fractions in FIGS. 6A-6C have the same definitions as those shown in FIG. 5 and denote motion-compensated interpolated frames. In FIGS. 6A-6C, repeat frames A, B and C in all the image output modes denote repeating display of its corresponding original frames. Additionally, throughout the specification and claims, the term "intermediate frame(s)" refers to additional frame(s) inserted (or padded) between any two consecutive original frames to achieve a desired frame rate and the term "interpolated frame(s)" refers to motion-compensated interpolated frame(s). The intermediate frame can be either an interpolated frame or a repeat frame that reproduces the original image content of its previous frame.

FIG. 6A shows a relationship of an input video stream and three output video streams corresponding to three image output modes while the frame rate is increased from 24 fps to 120 fps. Referring to FIGS. 1 and 6A, the original film sequence of a video source (frame rate: 24 fps) inputted to the MV detecting circuit 110 is A-B-C-D. When the frame rate is to be increased from 24 fps to 120 fps (by an enlargement factor of five), four (=120/24−1) additional intermediate frames need to be inserted between any two consecutive original frames of the input video stream to achieve the desired frame rate of 120 fps. In the case of FIG. 6A, three image output modes are available to be selected. In a high quality mode, the four additional intermediate frames are all interpolated frames (1/5, 2/5, 3/5, 4/5). In an intermediate mode, the four additional intermediate frames include two repeat frames and two interpolated frames (1/2, 1/2). In a repeat mode, the four additional intermediate frames are all repeat frames. If the consecutive frames with the same image content are regarded as one frame group, the numbers of frames of each frame group in the intermediate mode are in the ratio of 3:2:3:2 . . . . Since the enlargement factor (5) by which the frame rate is increased is an odd number, the number of frames contained in each frame group can not be divided equally or the same. In another embodiment, the numbers of frames of each frame group in the intermediate mode are in the ratio of 2:3:2:3 . . . (not shown). According to the invention, in order to keep an object in the images moving with substantially constant speed and keep images smooth and steady, the numbers of frames in each frame group should keep as close as possible to each other (for example: in the ratio of 2:2:2 . . . , or in the ratio of 3:3:3 . . . ), and then the image juddering will be reduced greatly. Therefore, even though the number of frames of each frame group in the intermediate mode can not be divided equally or the same, the less the difference between the previous frame group and the following frame group in terms of the number of frames, the better the image quality will be, for example, in the range of (−1) to (+1).

In the case of FIG. 6A, the image output modes are roughly divided into three modes: repeat mode, intermediate mode and high quality mode. According to the invention, in addition to the high quality mode and the repeat mode, depending on the enlargement factor by which the frame rate is increased (the frame rate is increased by a factor of five in the case of FIG. 6A) and different application needs, the intermediate mode can be further divided into more intermediate levels, e.g., intermediate mode one, intermediate mode two, intermediate mode three, and so on.

FIG. 6B shows a relationship of an input video stream and four output video streams corresponding to four image output modes while the frame rate is increased from 20 fps to 120 fps. Referring to FIG. 6B, the original film sequence of a video source (frame rate: 20 fps) inputted to the MV detecting circuit 110 is A-B-C. When the frame rate is to be increased from 20 fps to 120 fps (by an enlargement factor of six), five (=120/20−1) additional intermediate frames need to be inserted (or padded) between any two consecutive original frames of the input video stream to achieve the desired frame rate of 120 fps. In the case of FIG. 6B, four image output modes are available to be selected. In a high quality mode, the five additional intermediate frames are all interpolated frames (1/6, 2/6, 3/6, 4/6, 5/6). In an intermediate mode one, the five additional intermediate frames include two repeat frames and three interpolated frames (1/2). In an intermediate mode two, the five additional intermediate frames include one repeat frame and four interpolated frames (1/3, 2/3). In a repeat mode, the five additional intermediate frames are all repeat frames. If the consecutive frames with the same image content are regarded as one frame group, the numbers of frames of each frame group in the intermediate mode one are in the ratio of 3:3:3 . . . . By contrast, the numbers of frames of each frame group in the intermediate mode two are in the ratio of 2:2:2:2 . . . . This is because the enlargement factor (6) by which the frame rate is increased is a multiple of both 2 and 3 and thus can be divided equally. Since the number of frames of each frame group in each intermediate mode is identical, each intermediate mode can keep an object in the images moving with substantially constant speed, thereby rendering smooth and steady images.

FIG. 6C shows a relationship of an input video stream and a plurality of output video streams while the frame rate is increased from P fps to Q fps. Referring to FIG. 6C, assuming Q>P and Q/P=n (the frame rate is increased by an enlargement factor of n), the original film sequence of a video source (frame rate: P fps) inputted to the MV detecting circuit 110 is A-B-C. When the frame rate is to be increased from P fps to Q fps, (n−1) additional intermediate frames need to be inserted (or padded) between any two consecutive original frames of the input video stream to achieve the desired frame rate of Q fps. At this moment, there are multiple image output modes available to be selected. In a high quality mode, the (n−1) additional intermediate frames are all interpolated frames (1/n, 2/n, ..., (n−1)/n). In a repeat mode, the (n−1) additional intermediate frames are all repeat frames. As mentioned above, the number of the intermediate modes depends on the enlargement factor (n) by which the frame rate is increased, different application needs and hardware cost. For example, when n is a number of the positive integer powers of 2, the (n−1) additional intermediate frames in the intermediate mode one include (n/2−1) repeat frames and (n/2) interpolated frames 1/2. When the consecutive frames with the same image content are regarded as one frame group, each frame group in the intermediate mode one has the same amount of frames (equal to n/2). In the intermediate mode two, the (n−1) additional intermediate frames include (n/4−1) repeat frames, (n/4) interpolated frames 1/4, (n/4) interpolated frames 2/4 and (n/4) interpolated frames 3/4. It is clear that each frame group in the intermediate mode two has the same amount of frames (equal to n/4). In the intermediate mode three, the (n−1) additional intermediate frames include (n/8−1) repeat frames and (n/8) interpolated frames 1/8, (n/8) interpolated frames 2/8, ... and (n/8) interpolated frames 7/8. It is clear that each frame group in the intermediate mode three has the same amount of frames (equal to n/8). The other intermediate modes can be obtained in the same manner and will not be described here. Therefore, when n is the number of the positive integer powers of 2, since each frame group in each intermediate mode has the same amount of frames, each intermediate mode can keep an object in the images moving with substantially constant speed, thereby rendering smooth and steady images.

On the other hand, while n is an odd or a prime number, each frame group of each intermediate mode might not have equal amount of frames, and then the numbers of frames of each frame group should be as close as possible to each other. For example, the difference between the previous frame group and the following frame group in terms of the number of frames had better fall in the range of (−1) to (+1) to keep an object in the images moving with substantially constant speed.

Figure 7:
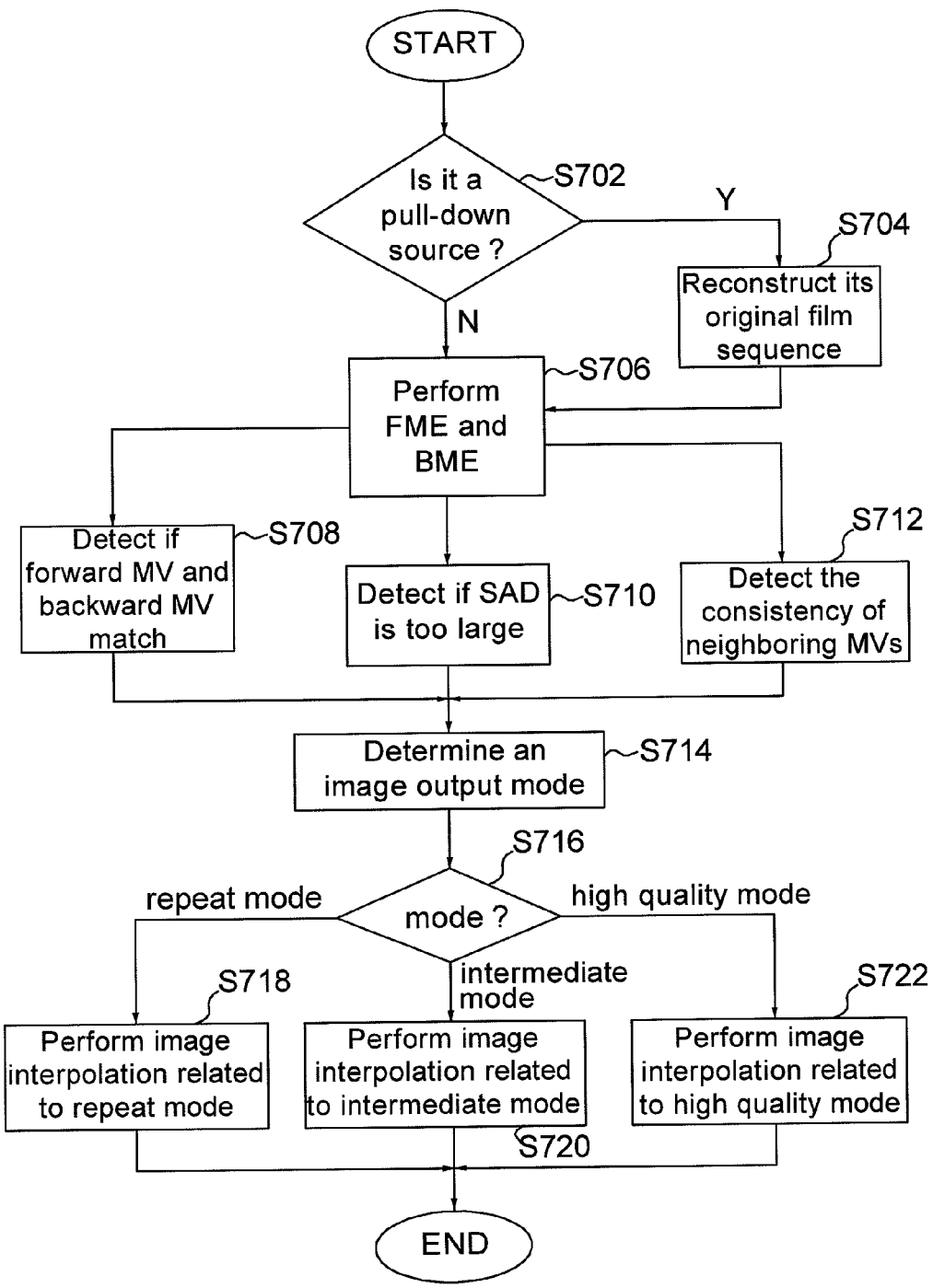
FIG. 7 is a flow chart showing a frame rate up-conversion method according to an embodiment of the invention.

FIG. 7 is a flow chart showing a frame rate up-conversion method according to an embodiment of the invention. A FRUC method of the invention is used to receive a current frame F1 and a previous frame F0 to generate at least one intermediate frame. The FRUC method of the invention will be described with reference to FIGS. 1, 4, 6A and 7.

Step S702: Determine if the input video source is a pull-down source. If YES, the flow goes to S704; otherwise, the flow goes to S706.

Step S704: Reconstruct an original film sequence of the pull-down source.

Step 706: According to the current frame F1 and the previous frame F0 related to the original film sequence, perform forward motion estimation (FME) and backward motion estimation (BME) to generate a forward MV table, a backward MV table, a forward SAD table and a backward SAD table.

Step S708: Detect if the forward MV and the backward MV match of the same block match. According to the forward MV table and the backward MV table, check if the forward MV and the backward MV of the same block match, and accumulate the number of the mismatched blocks to obtain a count value N1.

Step S710: Detect if the SAD value of each block in the forward SAD table and in the backward SAD table is too large. In an embodiment, sequentially check if the minimum SAD value of each block in the forward SAD table and in the backward SAD table is greater than a threshold value (such as 35), and accumulate the number of the blocks with the minimum SAD value greater than the threshold value to obtain a count value N2 finally.

Step S712: Detect the consistency of the neighboring motion vectors in each of the forward MV table and the backward MV table. In an embodiment, sequentially check if the direction and the magnitude of the motion vector of each block match the directions and the magnitudes of the motion vectors of its neighboring blocks in the forward MV table and in the backward MV table, and accumulate the number of the mismatched blocks to obtain a count value N3 finally.

Step S714: Determine an image output mode according to the count values N1, N2 and N3. In this step, an image output mode is determined dynamically according to the MV quality. In the case the example of FIG. 6A, the image output modes are divided into the high quality mode, the intermediate mode and the repeat mode.

Step S716: Determine which output mode it is. If it is the repeat mode, the flow goes to S718. If it is the intermediate mode, the flow goes to S720. If it is the high quality mode, the flow goes to S722.

Step S718: Perform image interpolation corresponding to the repeat mode to generate at least one intermediate frame according to the forward MV table, the backward MV table, the current frame F1 and the previous frame F0.

Step S720: Perform image interpolation corresponding to the intermediate mode to generate at least one intermediate frame according to the forward MV table, the backward MV table, the current frame F1 and the previous frame F0.

Step S722: Perform image interpolation corresponding to the high quality mode to generate at least one intermediate frame according to the forward MV table, the backward MV table, the current frame F1 and the previous frame F0.

In summary, by comparison with conventional FRUC apparatus that always generates interpolated images no matter the MV quality, the invention dynamically determines the image output mode and the number of the interpolated images according to the quality of the motion vectors. Meanwhile, the interpolated images keep an object in the images moving with substantially constant speed and render a smooth and steady display. Therefore, the invention not only reduces the visual impact due to incorrect motion vectors but also improves the image quality greatly, with better smoothness and less image juddering than conventional methods that repeat the original frames.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An apparatus of frame rate up-conversion configured to receive a current image and a previous image and generate at least one intermediate image, the apparatus comprising:
   a motion vector (MV) detecting circuit for performing forward motion estimation and backward motion estimation to generate a forward MV table, a backward MV table and at least one table of minimum motion estimation (ME) errors according to the current image and the previous image;

a control circuit for generating a control signal according to the forward MV table, the backward MV table and the at least one table of minimum ME errors; and a motion compensation circuit for performing corresponding image interpolation in response to the control signal to generate the at least one intermediate image according to the forward MV table, the backward MV table, the current image and the previous image;

wherein the control signal is related to one of a high quality mode, at least one intermediate mode and a repeat mode;

wherein the sequence of the current image and the previous image corresponds to an original film sequence;

wherein in each of the at least one intermediate mode, the at least one intermediate image comprises at least one interpolated image, and the at least one interpolated image is related to the current image and the previous image; and wherein in each of the at least one intermediate mode, an arrangement of the at least one interpolated image keeps an object in the images moving with substantially constant speed.

2. The apparatus according to claim 1, wherein the control circuit comprises:

a first detector for detecting whether a forward MV and a backward MV of the same block match and accumulating the number of the mismatched blocks to generate a first detecting value according to the forward MV table and the backward MV table;

a second detector for accumulating a number of first blocks whose minimum ME error is greater than a threshold value to generate a second detecting value according to the at least one table of minimum errors;

a third detector for accumulating a number of second blocks whose motion vector is not consistent with the motion vectors of its neighboring blocks in the forward MV table and in the backward MV table to generate a third detecting value; and a decision circuit for generating the control signal according to the first detecting value, the second detecting value and the third first detecting value;

wherein the current image and the previous image are divided into the same number of blocks.

3. The apparatus according to claim 2, wherein, as the first detecting value, the second detecting value and the third detecting value get greater, the number of the interpolated images in each of the at least one intermediate mode gets less, and wherein, as the first detecting value, the second detecting value and the third detecting value get less, the number of the interpolated images in each of the at least one intermediate mode gets greater.

4. The apparatus according to claim 1, wherein each of the at least one intermediate mode comprises a plurality of image groups and each image group comprises consecutive images having the same image content, and wherein at least one of the plurality of image groups is a group of interpolated images and each image group has the same number of images.

5. The apparatus according to claim 1, wherein the number of the at least one intermediate mode depends on an enlargement factor (n) by which the frame rate is increased.

6. An apparatus of frame rate up-conversion configured to receive a current image and a previous image and generate at least one intermediate image, the apparatus comprising:

a motion vector (MV) detecting circuit for performing forward motion estimation and backward motion estimation to generate a forward MV table, a backward MV table and at least one table of minimum motion estimation (ME) errors according to the current image and the previous image;

a control circuit for generating a control signal according to the forward MV table, the backward MV table and the at least one table of minimum ME errors; and a motion compensation circuit for performing corresponding image interpolation in response to the control signal to generate the at least one intermediate image according to the forward MV table, the backward MV table, the current image and the previous image;

wherein the control signal is related to one of a high quality mode, at least one intermediate mode and a repeat mode;

wherein the sequence of the current image and the previous image corresponds to an original film sequence;

wherein in each of the at least one intermediate mode, the at least one intermediate image comprises at least one interpolated image, and the at least one interpolated image is related to the current image and the previous image; and wherein each of the at least one intermediate mode comprises a plurality of image groups and each image group comprises consecutive images having the same image content, and wherein at least one of the plurality of image groups is a group of interpolated images and the numbers of images in each image group are close to each other.

7. The apparatus according to claim 6, wherein the number of the interpolated images depends on an enlargement factor (n) by which the frame rate is increased.

8. The apparatus according to claim 6, wherein in each of the at least one intermediate mode, an arrangement of the at least one intermediate image keeps an object in the images moving with substantially constant speed.

9. An apparatus of frame rate up-conversion configured to receive a current image and a previous image and generate at least one intermediate image, the apparatus comprising:

a motion vector (MV) detecting circuit for performing forward motion estimation and backward motion estimation to generate a forward MV table, a backward MV table and at least one table of minimum motion estimation (ME) errors according to the current image and the previous image;

a control circuit for generating a control signal according to the forward MV table, the backward MV table and the at least one table of minimum ME errors;

a motion compensation circuit for performing corresponding image interpolation in response to the control signal to generate the at least one intermediate image according to the forward MV table, the backward MV table, the current image and the previous image; and a recovery circuit, the output terminal of the recovery circuit being connected to an input terminal of the MV detecting circuit, the recovery circuit being configured to reconstruct an original film sequence of a pull-down film;

wherein the control signal is related to one of a high quality mode, at least one intermediate mode and a repeat mode; and wherein the sequence of the current image and the previous image corresponds to an original film sequence.

10. The apparatus according to claim 9, wherein in each of the at least one intermediate mode, the at least one intermediate image comprises at least one interpolated image, and the at least one interpolated image is related to the current image and the previous image.

11. The apparatus according to claim 10, wherein in each of the at least one intermediate mode, an arrangement of the at least one interpolated image keeps an object in the images moving with substantially constant speed.

12. The apparatus according to claim 10, wherein each of the at least one intermediate mode comprises a plurality of image groups and each image group comprises consecutive images having the same image content, and wherein at least one of the plurality of image groups is a group of interpolated images and each image group has the same number of images.

13. The apparatus according to claim 10, wherein each of the at least one intermediate mode comprises a plurality of image groups and each image group comprises consecutive images having the same image content, and wherein at least one of the plurality of image groups is a group of interpolated images and the numbers of images in each image group are close to each other.

14. The apparatus according to claim 10, wherein the number of the interpolated images depends on an enlargement factor (n) by which the frame rate is increased.

15. The apparatus according to claim 9, wherein the number of the at least one intermediate mode depends on an enlargement factor (n) by which the frame rate is increased.

16. The apparatus according to claim 9, wherein the control circuit comprises:
  a first detector for detecting whether a forward MV and a backward MV of the same block match and accumulating the number of the mismatched blocks to generate a first detecting value according to the forward MV table and the backward MV table;
  a second detector for accumulating a number of first blocks whose minimum ME error is greater than a threshold value to generate a second detecting value according to the at least one table of minimum errors;
  a third detector for accumulating a number of second blocks whose motion vector is not consistent with the motion vectors of its neighboring blocks in the forward MV table and in the backward MV table to generate a third detecting value; and
  a decision circuit for generating the control signal according to the first detecting value, the second detecting value and the third first detecting value;
wherein the current image and the previous image are divided into the same number of blocks.

17. The apparatus according to claim 16, wherein, as the first detecting value, the second detecting value and the third detecting value get greater, the number of the interpolated images in each of the at least one intermediate mode gets less, and wherein, as the first detecting value, the second detecting value and the third detecting value get less, the number of the interpolated images in each of the at least one intermediate mode gets greater.

18. The apparatus according to claim 9, wherein in each of the at least one intermediate mode, an arrangement of the at least one intermediate image keeps an object in the images moving with substantially constant speed.

* * * * *